(12) United States Patent
Mazurkiewicz et al.

(10) Patent No.: US 11,231,687 B2
(45) Date of Patent: Jan. 25, 2022

(54) ISOTOPE DETECTING DEVICES

(71) Applicant: HEWLETT-PACKARD DEVELOPMENT COMPANY, L.P., Spring, TX (US)

(72) Inventors: Paul Howard Mazurkiewicz, Fort Collins, CO (US); Ning Ge, Palo Alto, CA (US); Helen A Holder, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 226 days.

(21) Appl. No.: 16/332,817

(22) PCT Filed: Oct. 31, 2016

(86) PCT No.: PCT/US2016/059746
§ 371 (c)(1),
(2) Date: Mar. 13, 2019

(87) PCT Pub. No.: WO2018/080544
PCT Pub. Date: May 3, 2018

(65) Prior Publication Data
US 2019/0243311 A1    Aug. 8, 2019

(51) Int. Cl.
    *G04F 1/02*      (2006.01)
    *G04F 13/00*    (2006.01)
    *G01N 27/04*    (2006.01)
(52) U.S. Cl.
    CPC .............. *G04F 1/02* (2013.01); *G01N 27/045* (2013.01); *G04F 13/00* (2013.01)

(58) Field of Classification Search
    CPC .......... G01N 27/045; G04F 1/02; G04F 13/00
    See application file for complete search history.

(56) References Cited

U.S. PATENT DOCUMENTS

| | | |
|---|---|---|
| 3,959,630 A | 5/1976 | Hogberg |
| 8,864,038 B2 | 10/2014 | Marka et al. |

(Continued)

FOREIGN PATENT DOCUMENTS

| | | |
|---|---|---|
| CN | 1253660 | 5/2000 |
| CN | 101194159 | 6/2008 |
| CN | 101587192 | 11/2009 |

(Continued)

OTHER PUBLICATIONS

Isotope—Based Quantum Information, Vladimir G. Plekhanov, <https://arxiv.org/ftp/arxiv/papers/0909/0909.0820.pdf>.

(Continued)

*Primary Examiner* — Jay Patidar
(74) *Attorney, Agent, or Firm* — HPI Patent Department

(57) ABSTRACT

A device for detecting isotopes includes an isotope portion including a material including an isotope of an element, a reaction control portion to cause a chemical reaction of the material, and an electrical parameter portion to measure a change in an electrical parameter of the material, where the change in the electrical parameter is caused by the chemical reaction, and where the change in the electrical parameter is dependent on the isotope in the material, to detect the isotope by comparing the change in the electrical parameter of the material with a known electrical parameter associated with a known isotope.

11 Claims, 4 Drawing Sheets

(56) References Cited

U.S. PATENT DOCUMENTS

2013/0299591 A1* 11/2013 Marka .................. G06K 1/126
                                                                                 235/491
2014/0137277 A1     5/2014 Hymus et al.

FOREIGN PATENT DOCUMENTS

| CN | 202583141 | | 12/2012 |
|----|-----------|---|---------|
| CN | 105355868 | | 2/2016 |
| EP | 2801825 | | 11/2014 |
| GB | 965334 A | * | 7/1964 |
| WO | WO-0013042 A1 | | 3/2000 |
| WO | WO-0071966 A2 | | 11/2000 |
| WO | WO-2015000999 A1 | | 1/2015 |

OTHER PUBLICATIONS

Vladimir G. Plekhanov, Isotope-Based Quantum Information, <http://rentals.springer.com/product/9783642287503 >.
Physics Stack Exchange (online site) , What is the most efficient information storage?, http://physics.stackexchange.com/questions/144694/What-is-the-most-efficient-information-storage; Jul. 27, 2016; pp. 1-4.

* cited by examiner

ISOTOPE DETECTING DEVICES

BACKGROUND

Many elements have isotopes which occur in nature. An element is defined by the number of protons in its nucleus. For example, carbon has 6 protons in its nucleus, nitrogen has 7 protons in its nucleus, and zinc has 30 protons in its nucleus. Some elements have various isotopes with varying number of neutrons in the nucleus. For example, zinc has five stable isotopes that occur in nature with 34, 36, 37, 38 or 40 neutrons.

BRIEF DESCRIPTION OF THE DRAWINGS

For a more complete understanding of various examples, reference is now made to the following description taken in connection with the accompanying drawings in which.

DETAILED DESCRIPTION

Various examples provide for devices that may be formed using isotopes of elements. In various examples, a memory device may be formed wherein each memory element, or bit, may be formed of at least one isotope. An electrical parameter associated with the isotope may be measured to determine a state of the isotope. For example, electrical resistance of a material containing the isotope may be indicative of the level of the material containing the isotope or a ratio of two materials containing different isotopes. The level or ratio may be changed by a reaction, such as a chemical reaction, thus changing the determined state. The chemical reaction may be an oxidation of the isotope and may be reversible.

As noted above, various elements may have stable isotopes which occur in nature. The rate of a chemical reaction involving the element may change depending on the isotope of the element used in the reaction. For example, the reactions below illustrate the use of different isotopes of carbon in reactions of methyl bromide and cyanide:

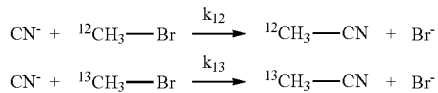

The use of different isotopes changes the rate of the reaction, an effect known as the kinetic isotope effect (KIE). In the example above, the rate of the reaction is reduced with the use of carbon 13 when compared to the rate of the reaction using carbon 12. In the example above, KIE may be represented as:

$$KIE = k_{12}/k_{13} = 1.082 \pm 0.008$$

In various examples, various aspects of one or more isotopes may be used to detect or determine an electrical parameter. For example, a rate of reaction may correspond to a change in electrical resistance of the material containing the isotope. In this regard, the level of a material containing an isotope or the ratio of two materials containing different isotopes may be determined based on a measured electrical parameter, such as resistance. For example, a chemical reaction may include oxidation of an isotope. Increased oxidation may result in reduced electrical resistance. Thus, when two materials containing different isotopes are oxidized for the same length of time, due to a faster oxidation of the material with one isotope compared to the material with the other isotope, the electrical resistance of the two materials may be different.

Thus, isotopic material may be detected in an efficient and cost-effective manner without the use of expensive and bulky equipment, such as mass spectrometers. Further, security may be enhanced with knowledge of material and isotopes used to encode information available and known only to a limited set of entities or users, such as a manufacturer, for example. Additionally, testing or detection of the isotopic material may be performed without any destructive operation that may require, for example, removal of the isotopic material.

Figure 1:
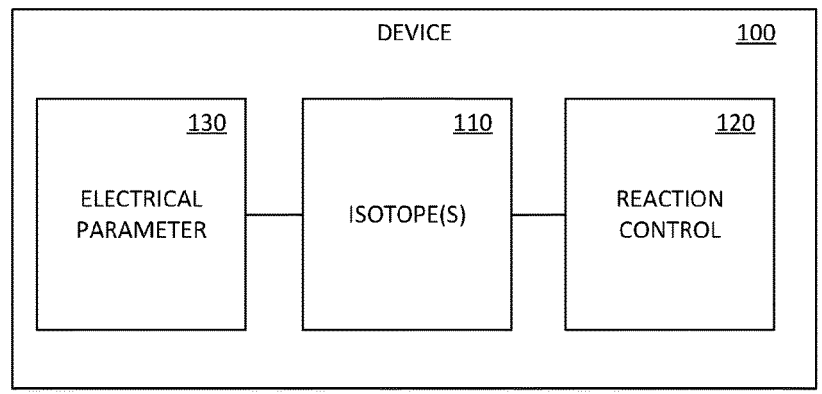
FIG. 1 is a schematic illustration of an example device.

Referring now to the figures, FIG. 1 illustrates an example device with at least one isotope. In the example of FIG. 1, the example device 100 includes an isotope portion 110, a reaction control portion 120 and an electrical parameter portion 130. In various examples, the example device 100 may be implemented on a printed circuit board (PCB).

The isotope portion 110 may include a material which has at least one isotope. For example, the isotope portion 110 may include a material with a stable isotope of elements such as zinc, molybdenum or nickel, for example. In various examples, in addition to the isotope(s), the material may include other components which may be needed for a reaction involving the isotope(s), for example.

The reaction control portion 120 may be provided to cause a chemical reaction related to the isotope(s) in the material. For example, the reaction control portion 120 may cause an electrical current to pass through the material in the isotope portion 110, thus causing an oxidation of the material with the isotope(s). In this regard, the reaction control portion 120 may cause oxidation to occur by flowing current in one direction. Similarly, the reaction control portion 120 may cause reversal of the oxidation to occur by flowing the current in the opposite direction. Thus, the reaction control portion 120 may selectively cause the oxidation or reverse the oxidation.

The electrical parameter portion 130 of the example device 100 of FIG. 1 is provided to measure an electrical parameter associated with the isotope portion 110 or the material having the isotope(s) in the isotope portion 110. In various examples, the measured electrical parameter may be a resistance value associated with the material having the isotope(s). In other examples, the electrical parameter portion 130 may measure a current and/or time to change the resistance value by a predetermined amount, for example.

In one example, the isotope portion 110 includes a material with a single isotope. As the reaction control portion 120 causes or reverses a chemical reaction such as, for example, oxidation of the material with the single isotope, the level of the material with the isotope may increase or decrease, depending on the direction of the chemical reaction. In turn, this may increase or reduce the resistance value of the material. Thus, the electrical parameter portion 130 may measure a change in resistance, and the change in resistance may be associated with the level of the material with the isotope.

In other examples, the isotope portion 110 includes a material with at least two isotopes. As the reaction control portion 120 causes or reverses a chemical reaction such as, for example, oxidation of the material, the ratio of two materials with different isotopes may increase or decrease in accordance with KIE described above, depending on the direction of the chemical reaction. In turn, this may increase or reduce the resistance value of the material. Again, the electrical parameter portion 130 may measure a change in resistance, and the change in resistance may be associated with the ratio of materials with the different isotopes.

Figure 2:
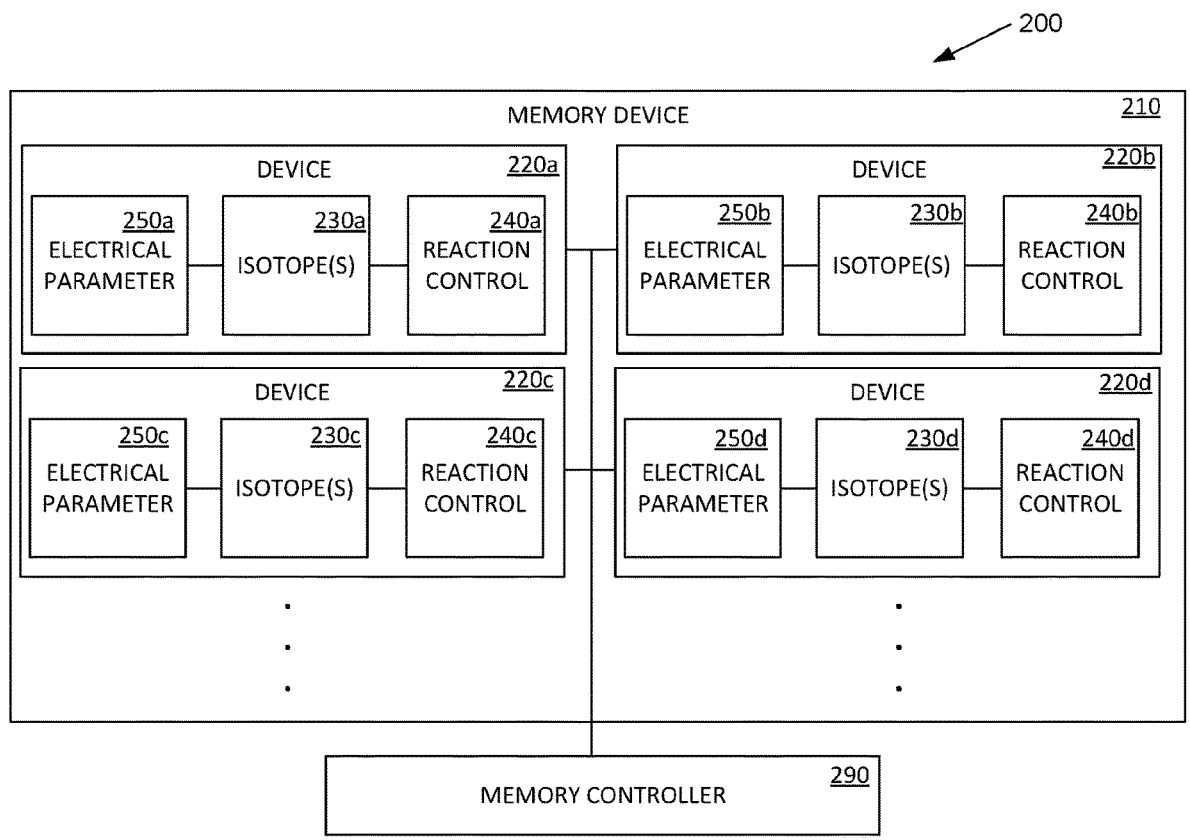
FIG. 2 is a schematic illustration of an example system.

Referring now to FIG. 2, an example system a various isotope devices is illustrated. In the example of FIG. 2, the example system 200 may be a memory system which may be implemented in any of a variety of electronic devices. The example system 200 of FIG. 2 provides an example storage system built with isotope devices similar to the example device 100 described above with reference to FIG. 1.

In the example of FIG. 2, the example system 200 includes a memory device 210 and a memory controller 290 to access the memory device 210. The memory device 210 is provided with an array of devices 220a-n, each of the devices 220a-n being similar to the example device 100 described above with reference to FIG. 1.

In the illustrated example of FIG. 2, each of the devices 220a-n is provided with an isotope portion 230, a reaction control portion 240 and an electrical parameter portion 250. Each of the isotope portion 230, a reaction control portion 240 and an electrical parameter portion 250 is similar to the isotope portion 110, the reaction control portion 120 and the electrical parameter portion 130 of the example device 100 described above with reference to FIG. 1.

In one example, each isotope portion 230a-n of the devices 220a-n of the example memory device 210 is provided with an identical material with at least one isotope. For example, the devices 220a-n may contain the same element but with different amounts of an isotope. In other examples, the isotope portion 230a-n of each device 220a-n has a distinct isotope or distinct combination of isotopes. In various examples, each device 220a-n may encode information using a selected level of an isotope in the material. For example, a higher amount of the isotope may be indicative of a "1", while a lower amount of the isotope may be indicative of a "0".

In various examples, the memory controller 290 may be provided to read from the memory device 210. In one example, the memory controller 290 may read from the memory device 210 by measuring an electrical parameter (e.g., resistance) associated with an isotope portion 230 of a device 220 using the corresponding electrical parameter portion 250.

The example system 100 of FIG. 1 may be used as a memory device for storage and retrieval of data, for example. In this regard, the memory controller 290 of the example system 200 of FIG. 2 may be used to read from each of the memory devices 220a-n. In other examples, the example system 100 may be provided to store security information. For example, the stored information may be retrieved (and interpreted) only with knowledge of the isotopes used in each device 220a-n.

Figure 3:
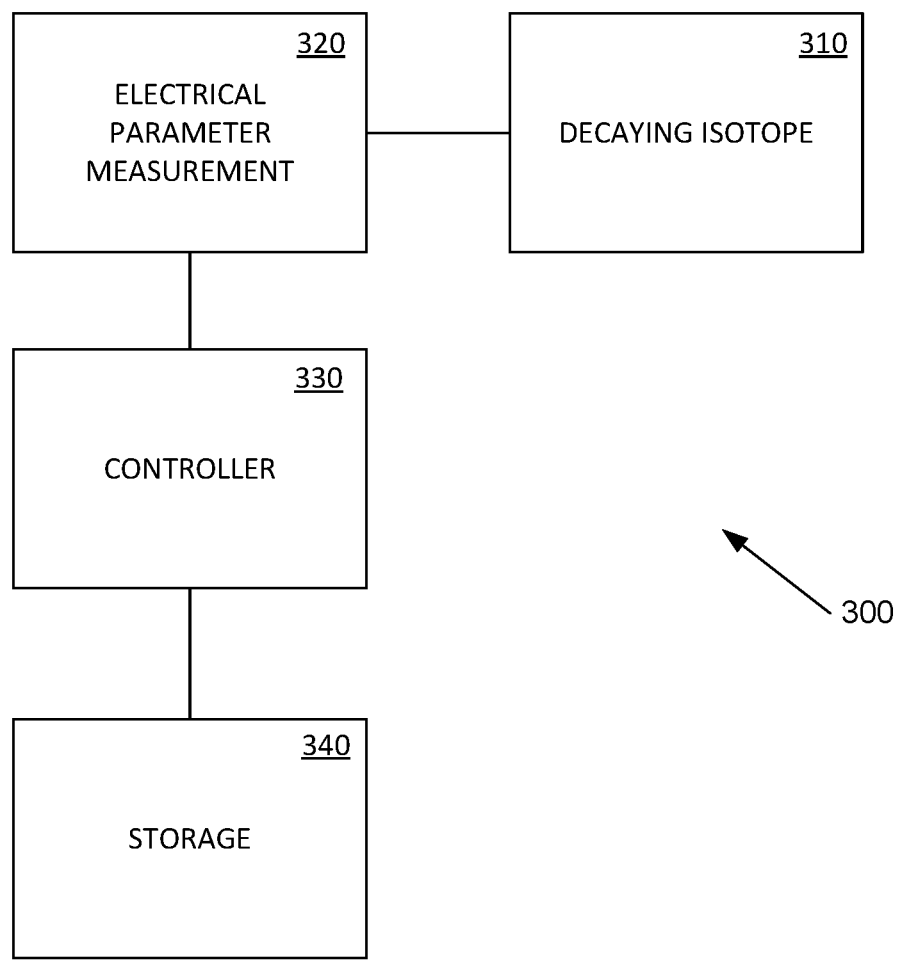
FIG. 3 is a schematic illustration of another example system.

Referring now to FIG. 3, a schematic illustration of another example system is illustrated. The example system 300 of FIG. 3 includes a decaying isotope portion 310, an electrical parameter measurement portion 320, a controller 330 and a storage portion 340. The decaying isotope portion 310 may be similar to the isotope portion 110 of the example system 100 of FIG. 1. In this regard, the decaying isotope portion 310 of FIG. 3 includes a material with at least one isotope. In the example of FIG. 3, the isotope in the material in the decaying isotope portion 310 is a decaying isotope with a known half-life.

The electrical parameter portion 320 of the example system 300 of FIG. 3 is similar to the electrical parameter portion 120 of FIG. 2. In this regard, the electrical parameter portion 320 can measure an electrical parameter (e.g., resistance) associated with the material containing the decaying isotope. As the isotope of the decaying isotope portion 310 decays, the electrical parameter portion 320 can detect a changing electrical parameter.

In one example, the controller 330 of the example system 300 may cause the electrical parameter measurement portion 320 to measure an electrical parameter associated with the decaying isotope of the decaying isotope portion 310. The measured value and the time at which the measurement is made may be used as reference values that may be stored in the storage portion 340. Subsequently, the controller 330 may cause the electrical parameter measurement portion 320 to measure the electrical parameter associated with the decaying isotope of the decaying isotope portion 310. The measured value may be used in conjunction with the reference measurement and time stored in the storage portion 340, along with the known half-life of the decaying isotope, to determine an elapsed time since the reference time. Thus, the example system 300 may be used for time-based applications, such as warranty verification of a device, for example. The elapsed time may be compared to a length of time the warranty is to determine whether the elapsed time exceeds the warranty's time length and thus is no longer under warranty. The elapsed time may be computed to other indications of the age of the system to ensure such other indications have not been changed.

Figure 4:
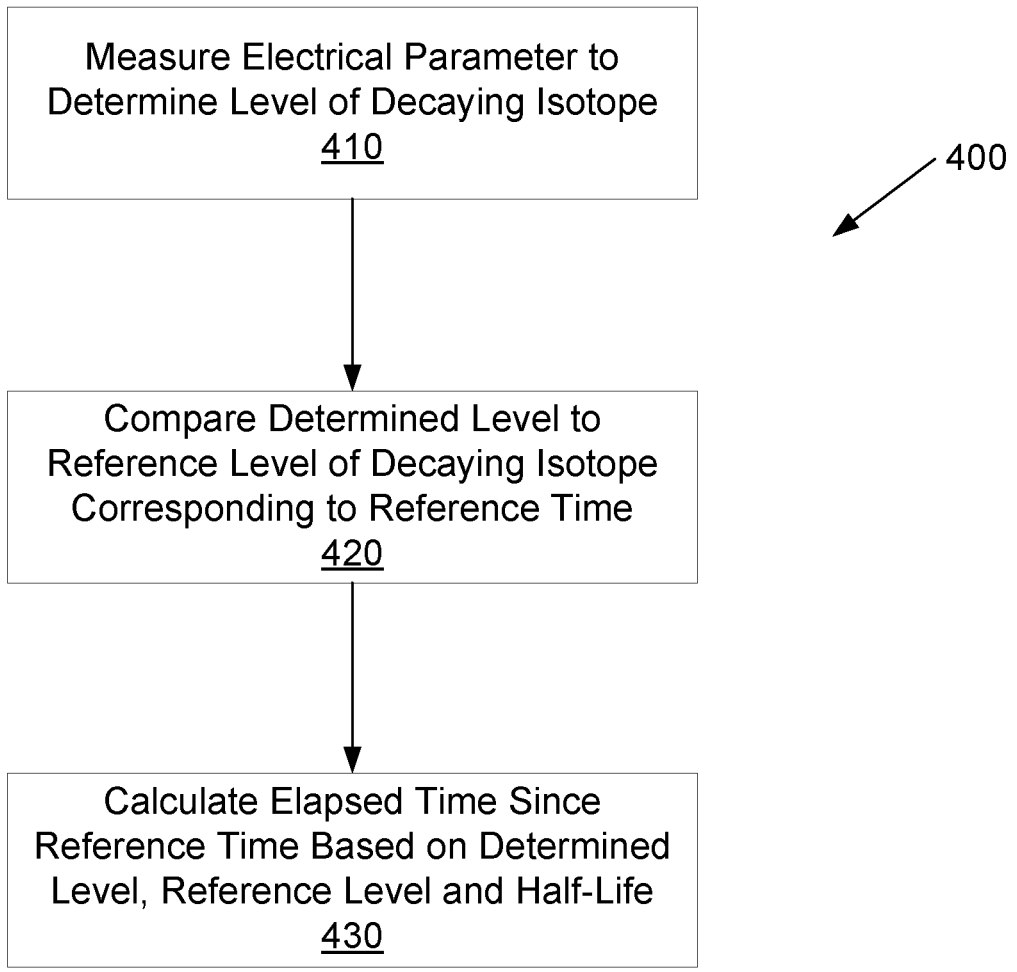
FIG. 4 is a flow chart illustrating an example process.

Referring now to FIG. 4, a flow chart illustrates an example method 400. The example method 400 of FIG. 4 may be implemented in a variety of manners, such as in the controller 330 of the example system 300 of FIG. 3.

The example method 400 includes measuring an electrical parameter associated with a decaying isotope (block 410). As described above, the controller 330 may cause the electrical parameter measurement portion 320 to measure the electrical parameter associated with the decaying isotope of the decaying isotope portion 310. The electrical parameter may be used to determine a present level of the decaying isotope.

The determined level of the decaying isotope is compared to a reference level of the decaying isotope corresponding to a reference time (block 420). As described above with reference to FIG. 3, a reference level and reference time may be measured and stored in the storage portion 340. In one example, the reference level and time may be measured and stored at an initial boot-up or initialization of an electronic device. Thus, warranty verification may be measured from the initial boot-up.

In the example method 400, an elapsed time since the reference time may be calculated based on the determined present level, the reference level and a half-life associated with the decaying isotope (block 430). As noted above, the elapsed time may be used to determine a warranty status of an electronic device containing the decaying isotope.

Figure 5:
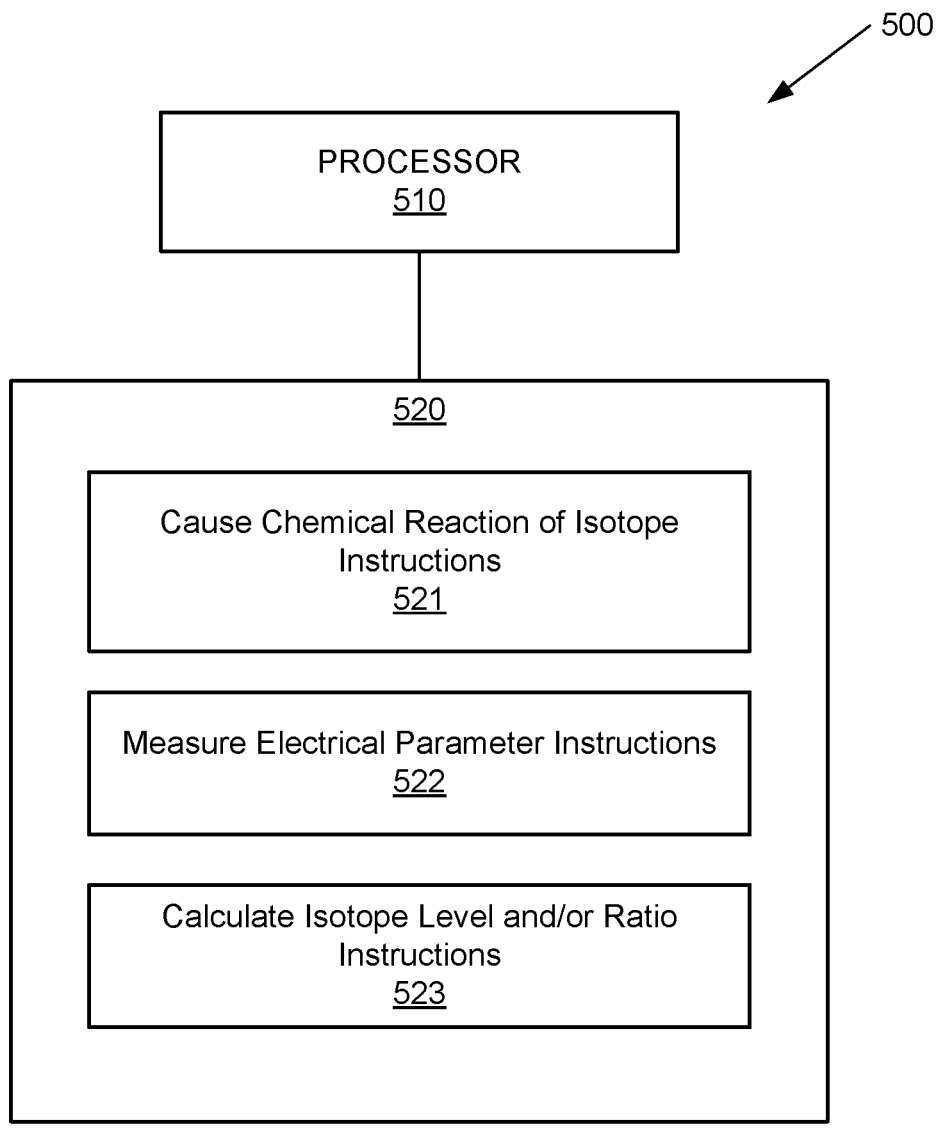
FIG. 5 illustrates a block diagram of an example system with a computer-readable storage medium including instructions executable by a processor.

Referring now to FIG. 5, a block diagram of an example system is illustrated with a non-transitory computer-readable storage medium including instructions executable by a processor. The system 500 includes a processor 510 and a non-transitory computer-readable storage medium 520. The computer-readable storage medium 520 includes example instructions 521-523 executable by the processor 510 to perform various functionalities described herein. In various examples, the non-transitory computer-readable storage medium 520 may be any of a variety of storage devices including, but not limited to, a random access memory (RAM) a dynamic RAM (DRAM), static RAM (SRAM), flash memory, read-only memory (ROM), programmable ROM (PROM), electrically erasable PROM (EEPROM), or the like. In various examples, the processor 510 may be a general purpose processor, special purpose logic, or the like.

The example instructions include causing chemical reaction of isotope instructions 521. As described above with reference to FIG. 1, the reaction control portion 120 may cause a chemical reaction (e.g., oxidation) related to a material containing at least one isotope.

The example instructions further include measuring electrical parameter instructions 522. As described above with reference to FIG. 1, the electrical parameter portion 130 of the example device 100 may measure an electrical parameter (e.g., resistance) associated with the isotope portion 110 or the material having at least one isotope.

The example instructions further include calculating an isotopic material level and/or ratio instructions. As described above with reference to FIG. 1, in some examples, the isotope portion 110 includes a material with a single isotope. As the reaction control portion 120 causes or reverses a chemical reaction such as, for example, oxidation of the material with the single isotope, the level of isotope in the material may increase or decrease, depending on the direction of the chemical reaction. In turn, this may increase or reduce the resistance value of the material. Thus, the electrical parameter portion 130 may measure a change in resistance, and the change in resistance may be associated with a change in the level of the material containing the isotope.

In other examples of the example system 100 of FIG. 1, the isotope portion 110 includes materials with at least two different isotopes. As the reaction control portion 120 causes or reverses a chemical reaction of each material such as, for example, oxidation of the materials, the ratio of two materials containing different isotopes may increase or decrease in accordance with KIE described above, depending on the direction of the chemical reaction. In turn, this may increase or reduce the resistance value of the material. Again, the electrical parameter portion 130 may measure a change in resistance, and the change in resistance may be associated with a change in the isotope ratio.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
   an isotope portion including a material comprising an isotope of an element;
   a reaction control portion to cause a chemical reaction of the material; and
   an electrical parameter portion to measure a change in an electrical parameter of the material, wherein the change in the electrical parameter is caused by the chemical reaction, and wherein the change in the electrical parameter is dependent on the isotope in the material, to detect the isotope by comparing the change in the electrical parameter of the material with a known electrical parameter associated with a known isotope.

2. The device of claim 1, the chemical reaction is an oxidation of the material comprising the isotope.

3. The device of claim 2, wherein the reaction control portion is to selectively cause the oxidation or reverse the oxidation.

4. The device of claim 1, wherein the electrical parameter is a resistance value associated with the material comprising the isotope.

5. The device of claim 4, wherein the electrical parameter portion is to measure a current and/or time to change the resistance value by a predetermined amount.

6. The device of claim 1, wherein the material includes two isotopes, and
   wherein the electrical parameter is associated with a ratio of the two isotopes.

7. The device of claim 1, further comprising a memory controller, wherein the memory controller is to access the electrical parameter portion to perform a read operation based on a determined change in the electrical parameter.

8. A non-transitory computer-readable storage medium encoded with instructions executable by a processor of a computing system, the computer-readable storage medium comprising instructions to:
   cause a chemical reaction of a material including an isotope of an element;
   measure a change in an electrical parameter of the material, wherein the change in the electrical parameter is caused by the chemical reaction, and wherein the change in the electrical parameter is dependent on the isotope in the material; and
   detect the isotope by comparing the change in the electrical parameter with a known electrical parameter associated with a known isotope.

9. The non-transitory computer-readable storage medium of claim 8, wherein the chemical reaction is an oxidation of the material including the isotope.

10. The non-transitory computer-readable storage medium of claim 8, wherein the instructions to cause a chemical reaction includes instructions to selectively cause the oxidation or reverse the oxidation.

11. The non-transitory computer-readable storage medium of claim 8, wherein the electrical parameter is a resistance value associated with the material including the isotope.

* * * * *